United States Patent [19]

Mayo, Jr.

[11] Patent Number: 4,573,827
[45] Date of Patent: Mar. 4, 1986

[54] LATERALLY MOVABLE POWERHOUSE
[75] Inventor: Howard A. Mayo, Jr., York, Pa.
[73] Assignee: Allis-Chalmers Corporation, Milwaukee, Wis.
[21] Appl. No.: 609,027
[22] Filed: May 10, 1984
[51] Int. Cl.$^4$ ............................................. E02B 9/08
[52] U.S. Cl. ...................................... 405/78; 290/43; 405/75
[58] Field of Search ........................ 405/78, 75, 76, 77; 290/42, 43, 52, 53, 54

[56] References Cited
U.S. PATENT DOCUMENTS

| | | | |
|---|---|---|---|
| 880,103 | 2/1908 | Schildhauer | 405/103 |
| 3,916,628 | 11/1975 | Halpern et al. | 405/103 |
| 4,143,990 | 3/1979 | Atencio | 405/78 |
| 4,319,142 | 3/1982 | Mayo | 405/78 X |
| 4,326,819 | 4/1982 | Atencio | 405/78 |
| 4,476,396 | 10/1984 | Calvert | 290/43 X |

Primary Examiner—Dennis L. Taylor
Attorney, Agent, or Firm—Timothy R. Conrad

[57] ABSTRACT

A hydraulic turbine installation is disclosed for a site comprising a dam having a floor and opposing sidewalls defining a spillway. The installation comprises a frame member which slideably engages the spillway floor on a downstream side of the dam. The frame member is slideable transverse to a direction of water flow through the spillway. A hydraulic turbine and connected generator are carried by the frame member. The frame member is provided with an intake such that when the frame member is in a first position within the spillway, water flow through the spillway is directed through the turbine runner. The frame member is slideable to a second position with the frame member out of the spillway and water flow through the spillway uninterrupted. Power actuated means such as hydraulic servomotors are provided for sliding the frame member between the first and second positions.

12 Claims, 3 Drawing Figures

LATERALLY MOVABLE POWERHOUSE

BACKGROUND OF THE INVENTION

1. Field of the Invention

This invention relates to an apparatus for generating electrical power from flowing water. More particularly, this invention relates to an apparatus for the generation of electrical power from low head installations.

2. Statement of the Prior Art

Throughout the United States there are many existing dams and other water flow control structures which are low head and can be used for power generation without excessive civil engineering construction. A problem in using such structures for power generation is that these structures are typically provided with spillways which must be capable of handling flood water conditions. While the spillways would be a desirable location to place a turbine, this is not possible since the spillway must not be permanently blocked.

One solution for using low head installations is to provide a powerhouse which is in a spillway when the turbine is to generate electricity. During flood conditions, the powerhouse structure is lifted within the spillway to provide generally uninterrupted flow of water to relieve the flood conditions. Such an apparatus is described in my commonly assigned U.S. Pat. No. 4,319,142. In the aforementioned patent, the powerhouse structure is lifted vertically within the spillway. One difficulty encountered from the powerhouse structure taught in the aforementioned patent is that a great deal of energy is required to lift the powerhouse. U.S. Pat. No. 4,143,990, to Atencio teaches a powerhouse structure upstream of a dam and lifted or pivoted to a position with the powerhouse upstream of the spillway. Again, such structure would require a great deal of energy and the air chambers used to assist in generating bouyancy are difficult to fabricate to insure airtightness. Additionally in the latter teaching, flow control through the spillway is all or nothing. That is, either all the water is directed through the turbine when the powerhouse is in a power generating position, or all of the water is permitted to flow uninterrupted through the spillway when the turbine powerhouse is in a bypass position.

OBJECTS AND SUMMARY OF THE INVENTION

It is an object of the present invention to provide a hydraulic turbine installation for a spillway which is moved out of the spillway during flood conditions.

It is a further object of the present invention to provide a hydraulic turbine installation for a spillway where the turbine is moved laterally away from the spillway.

It is yet a further object of the present invention to provide a hydraulic turbine installation for a spillway which can permit partial uninterrupted flow of water through the spillway while still permitting flow of water through the turbine installation.

According to the preferred embodiment of the present invention, a hydraulic turbine installation is provided for a spillway. The installation comprises a frame member which is placed on the spillway floor and slideably engages the spillway floor for lateral movement thereon transverse to the flow of water through the spillway. The frame supports a hydraulic turbine installation which includes a turbine and a power generator. Bearing means are provided between opposing surfaces of the frame and the spillway floor permitting sliding engagement between the floor and the spillway. Power actuated means, such as hydraulic cylinders, are operatively connected to a foundation exterior of the frame for urging the frame away from the spillway to permit unobstructive flow of flood water through the spillway.

DESCRIPTION OF THE PREFERRED EMBODIMENT

Figure 3:
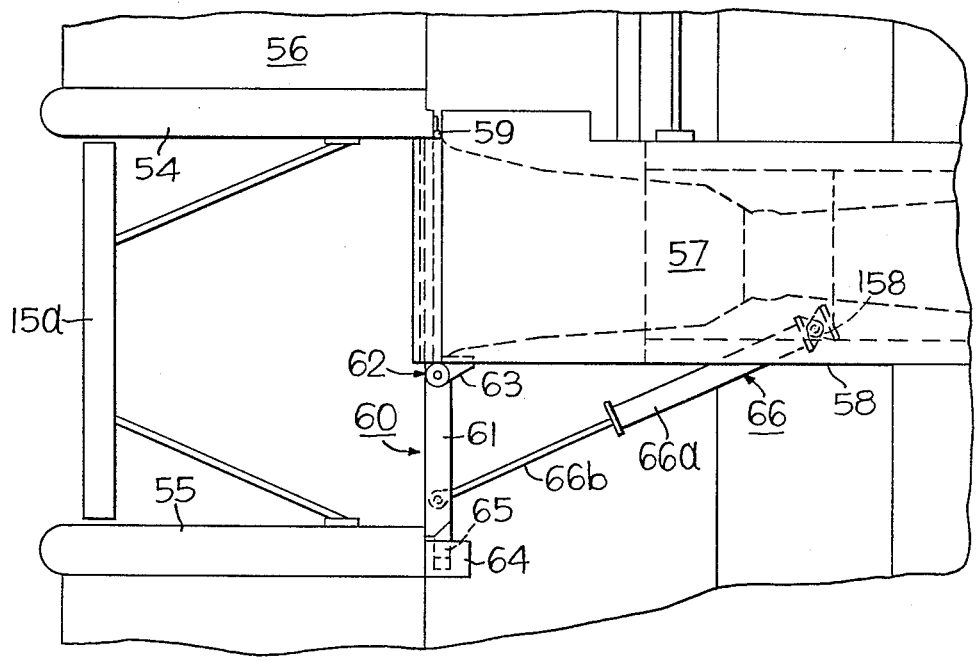
FIG. 3 is a partial plan view of an alternative embodiment of the present invention.

As shown in the drawings, a dam 10 is provided in a waterway having a pair of opposing sidewalls 11 and 12 and a floor 13 cooperating to define a spillway 13a. Spillways such as those shown are means of flood control. The floor 13 of the spillway 13a gradually descends from a higher upstream elevation 14 to a lower downstream elevation 15. As shown in FIG. 3, a flow control device, such as a Tainter gate 15a, is provided to control water flow through the spillway.

Figure 1:
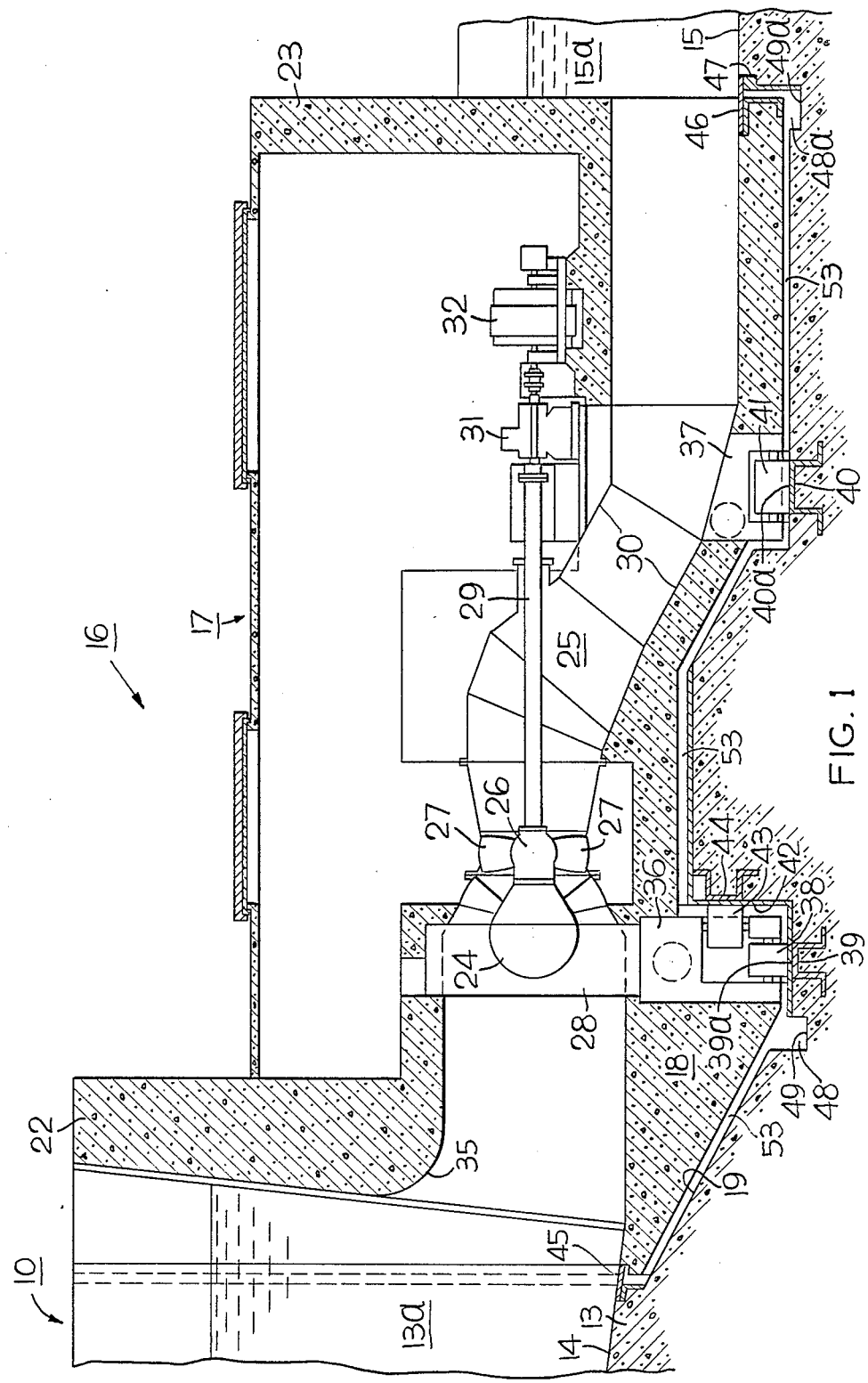
FIG. 1 is a view in elevation of a power unit installation with parts broken away to show interior detail.

A movable powerhouse 16 is provided downstream of the spillway having a frame member 17 which is shown as being fabricated from precast concrete. The frame member 17 is provided a floor portion 18 which opposes the floor 13 of the spillway 13a. As can be seen in FIG. 1, the floor 18 of the frame member 17 closely follows the contour of the spillway floor 13 in spaced relation to present a gap 19 between them extending from the upstream spillway floor 14 to the downstream spillway floor 15. Additionally, the frame 17 is provided with opposing sidewalls 20 and 21, a forewall 22 on an upstream end of the frame 17 and rearwall 23. The sidewalls 20 and 21, forewall 22 and rearwall 23 cooperate to define a box-like structure in which is provided a hydraulic turbine 24. The hydraulic turbine includes a hydraulic turbine passageway 25 formed from steel plate lining 30. A turbine runner 26 disposed within the passageway and provided with a plurality of radially extending runner blades 27 is supported for rotational motion by a turbine stay column 28 which is rigidly secured to the turbine passageway lining 30. An axially extending shaft 29 extends from the runner 26 through the passageway lining 30 and is coupled to a speed increaser 31. The output from the speed increaser 31 is utilized to drive a generator 32 which is connected to an electrical load or grid (not shown).

Figure 2:
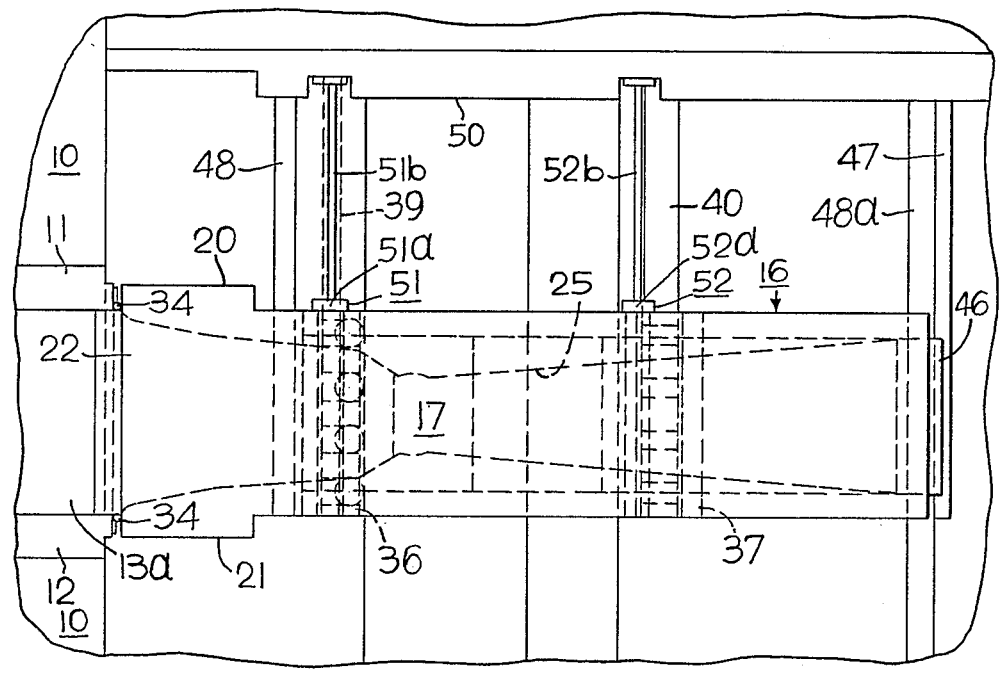
FIG. 2 is a plan view of the power installation of FIG. 1.

As shown in FIG. 2, the frame 17 is positioned downstream of the spillway with a first sidewall 20 of the frame 17 abutting the first sidewall 11 of the dam 10. Likewise, the second sidewall 21 of the frame 17 abuts the second sidewall 12 of the dam 10. Seals, such as inflatable seals 34, are provided disposed between the abutting sidewalls of the dam 10 and frame 17.

In the configuration shown in FIGS. 1 and 2, the forewall 22 of the frame member is provided with an opening submerged and in line with the downstream side of the spillway. The passageway 25 extends from the upstream reservoir in the spillway 13a to the tail race 15a on the downstream side of the structure. As shown in FIG. 1, the forewall 22 has a smoothly contoured nose portion 35 for permitting smooth flow of water from the spillway 13a to the turbine runner 26.

Structural steel supports 36 and 37 are provided embedded within the floor portion 18 of the frame 17 running transverse to the direction of water flow through the spillway 13a. The upstream support 36 is securely embedded within the floor portion 18 beneath the turbine stay column 28 and is integrally connected with the stay column 28 as by welding. Likewise, the downstream structural support 37 is securely embedded within the floor portion 18. The downstream support 37 is welded to the water passageway lining 30 and positioned beneath the speed increaser 31.

As can be seen in FIG. 1, the bottom of the floor portion 18 of the frame member 17 generally follows the contour of the spillway floor 13. Beneath the upstream and downstream support members 36 and 37, the floor portion 18 of the frame member 17 and the floor 13 of the spillway are flat and horizontal. The structural supports 36 and 37 each support a plurality of rollers 38 and 41 having horizontal rotational axis and aligned transverse to the direction of water flow through the spillway. Bearing rails 39 and 40 are provided embedded within the floor 13 of the spillway. A bearing surface 39a of the upstream bearing rail 39 is vertically aligned with the ustream rollers 38 with the upstream rollers 38 bearing against the bearing surface 39a. Likewise the bearing surface 40a of the downstream bearing rail 40 is vertically aligned with the downstream rollers 41 with the downstream rollers 41 bearing against the bearing surface 40a. Accordingly, the frame is transversely movable with the rollers permitting relatively low friction sliding motion along the bearing rails.

As can be seen in FIG. 1, the floor 13 of the spillway is elevated intermediate the bearing rails 39 and 40 with the surface of the spillway floor 13 and opposing surface of the frame floor 18 presenting a vertical surface 42 immediately downstream of the upstream structural support 36. A plurality of support rollers 43 are provided within the upstream support 36 and are rotatable about a generally vertical axis. A bearing rail 44 is provided embedded within an opposing surface of the elevated spillway floor abutting the rollers 43. The rollers 43 and the rail 44 cooperate to take up hydraulic loads imposed upon the frame member by reason of water flowing from the spillway 13a to the tail race 15a. Vertical surface 42 also acts as an energy dissipator when water is discharged through the spillway.

To provide for protection of the rollers, an upstream seal 45 is provided secured to the spillway floor 13 and overlying the gap 19 between the spillway floor 13 and the frame 17. Likewise, a downstream seal 46 is provided secured to the frame 13 and extending over the gap 19 between the floor 13 and the frame 17 with a free end slideably engaging a bearing surface 47 on the downstream spillway floor 15. Dirt traps 48 and 48a are provided comprising troughs 49 and 49a formed within the spillway floor extending transversely across the floor 13 upstream of the upstream support 36 and at the downstream edge of the frame member 17. Dirt and debris which may flow through the gap 19 between the frame and the floor are trapped within the dirt traps 48 and 48a and prevented from fouling the bearing surfaces and rollers.

Referring to FIG. 2, the frame member 17 is shown on the downstream side of the dam 10. The forewall 22 of the frame 17 abuts the sidewalls 10 and 12 of the dam. The inflatable seal 34 between the sidewalls 11 and 20 in the frame 17 provide a generally watertight seal urging all water flow through the spillway to enter into the passageway 25 for rotating the turbine runner 26. As shown in FIG. 2, the side edge of the river is provided with a foundation wall 50 with the distance between the foundation wall and the sidewall 20 of the frame member 17 equal or exceeding the width of the frame member 17. Further, as shown in FIG. 2, the upstream bearing rail 39 and the downstream bearing rail 40 extend to the foundation wall 50 as does the downstream bearing surface 47. Accordingly, the frame member 17 may slide along the bearing rails 39 and 40 toward the foundation wall 50 to a second position (not shown) with the flow of water through the spillway unimpeded by the frame member 17. The movement of the frame member toward the foundation wall 50 is accomplished by means of power actuated hydraulic servomotors 51 and 52. Each of the servomotors comprises an hydraulic cylinder with a reciprocating piston. As shown in the Figures, the upstream servomotor 51 has its cylinder 51a secured to the upstream support member 36. The piston rod 51b of the upstream servomotor 51 is secured to the foundation wall 50. Likewise, the cylinder 52a of the downstream servomotor 52 is secured to the downstream structural support 37 and the piston rod 52b of the downstream servomotor 52 is secured to the foundation wall 50. As shown in FIG. 2, the servomotors 51 and 52 are shown in the fully extended position with the pistons of the servomotors sized to extend the full distance between the frame member 17 and the wall 50 when the frame member is in its first position. When the servomotors are contracted, the frame member is urged toward the foundation wall 50 and slides along the bearing rails 39 and 40. Accordingly, the frame member 17 may be moved out of the way of the spillway during times of flood conditions to permit the generally uninterrupted flow of water from the upstream side of the dam 10 to the downstream side thereby relieving flood water stages. When the water is not in flood water conditions, the servomotors can be energized causing the expansion of the servomotors urging the frame member 17 away from the foundation wall 50 into the first position with water flow being directed through the turbine passageway for operation of the turbine. The side of the frame member 17 opposite the foundation wall 50 is provided with a scraper plate 53 which is ridgily secured to the frame member 17. As shown in FIG. 1, the scraper plate 53 extends the length of the frame member 17 and extends downwardly from the frame member through the gap 19 into close tolerance with the floor 13. As the frame member 17 is moved from its second position adjacent the foundation wall 50 toward the first position covering the spillway, the scraper plate 53 forces accumulated dirt and debris from the floor 13 and out of the dirt traps 48 and away from the bearing surfaces of the bearing rails 39 and 40.

Referring now to FIG. 3, an alternative form of the present embodiment is shown comprising a frame member 57 having a turbine (not shown) with the frame member to be positioned in front of a spillway defined between opposing walls 54 and 55 of a dam 56. Means are provided for sliding the frame member laterally away from sidewall 55 toward a foundation wall (not shown) extending from the sidewall 54. It will be appreciated that the means for accomplishing the lateral movement the frame member 57 is the same as that previously described for frame member 17. Frame 57 differs from frame member 17 in that the width of the forewall 58 of frame member 57 is insufficient to extend between the sidewall 54 and the sidewall 55. Accordingly, when in the first position as shown in FIG. 3, a gap extends between a side of the frame member and the sidewall 55. The side of the frame member facing the foundation wall is abutting sidewall 54 and is sealed there by means of an inflatable watertight seal 59.

An adjustable gate 60 is provided for regulating a flow of water between the frame member and the sidewall 55. The gate is shown as a flap gate having a gate leaf 61 sized to extend between the frame member 57 and the sidewall 55. A vertical edge 62 of the gate leaf is pivotally secured to the frame member 57 by means of a hinge 63. The downstream edge of the sidewall 55 is provided with a gate lock housing 64 which houses a plurality of horizontally disposed slideable lock pins 65. As shown in FIG. 3 the lock pins may be slid out of housing 64 and engage a downstream surface of the gate leaf 61 thereby locking the gate leaf 61 against the sidewall 55 and preventing water flow between the frame members 57 and the sidewall 55. The gate 60 may be opened (moved to a position with the gate leaf parallel and abutting the frame member 57 or moved to a closed position as shown in FIG. 3) by means of an hydraulic servomotor 66. The hydraulic servomotor 66 comprises a cylinder 66a and a reciprocating piston 66b. As shown in FIG. 3, the piston 66b is pivotally secured to the gate leaf and the cylinder 66a is pivotally secured to the frame member by means of hinge plate 158. Accordingly, the embodiment of the invention as shown in FIG. 3 may permit a partial relief of flood water conditions without the need for moving the frame member 57 completely out of the spillway and resulting in loss of electrical power being generated by the turbine.

From the foregoing detailed description of the present invention, it has been shown how the objects of the present invention have been attained in a preferred manner. However, modification and equivalence of the disclosed concepts, such as readily occur to those skilled in the art, are intended to be included in the scope of the invention. Thus, the scope of the invention is intended to be limited only by the scope of the claims such as are or may hereafter be appended hereto.

The embodiments of the invention in which an exclusive property or privilege is claimed are defined as follows:

1. A hydraulic turbine installation for a site comprising a dam having a floor and opposing sidewalls defining a spillway for water flow from an upper elevation to a lower elevation,
   a frame member;
   a hydraulic turbine carried by said frame member comprising a water passageway defined by said frame; a turbine runner within said passageway and a generator operably connected to said runner to be driven by said runner;
   said frame member having intake means for directing water to the runner;
   said floor having an upper surface including a plurality of bearing surface portions with said bearing surface portions on a downstream side of said dam and extending horizontally transverse to said direction of water flow; said bearings surface portions having a length horizontally transverse to said direction of water flow with said length sufficient to span said spillway and extend past a downstream side of said dam a distance greater than a width of said frame member;
   bearing means secured to a bottom surface of said frame member and aligned to support said frame member on said bearing surface portion for providing sliding movement of said frame horizontally transverse to said direction of water between a first position with said frame member intake means within said spillway and a second position with said frame member out of said spillway and on a downstream side of said dam;
   power actuated means for selectively sliding said frame member between said first and second positions.

2. A hydraulic turbine installation according to claim 1, wherein said floor and frame member are contoured to present opposing surfaces having at least one portion which is horizontal and transverse to said direction of water flow and at least one portion which is vertical and transverse to said direction of water flow with the frame member opposing surface upstream of the floor opposing surface; said horizontal and vertical portions provided with said bearing means.

3. a hydraulic turbine installation according to claim 2, wherein said floor and said frame member are spaced apart other than at said bearing means to define a gap between said floor and said frame member; means for sealing said gap from said spillway while permitting said sliding motion of said frame member.

4. A hydraulic turbine installation according to claim 3, wherein said floor is provided with a trough which cooperates with said gap to present a sudden increase in the volume of said gap immediately upstream of said bearing means.

5. A hydraulic turbine installation according to claim 4, wherein said frame member is provided with a scraper plate on a side thereof facing the spillway; said scraper plate rigidly secured to said frame and extending through said gap to within close tolerances of said floor.

6. A hydraulic turbine installation according to claim 5, wherein said power actuated means comprises a hydraulic servomotor means having one end secured to a side of said frame and another end secured to a foundation; said servomotor means operable to slide said frame member between said first and second positions.

7. A hydraulic turbine installation according to claim 6, wherein said frame member is provided with a plurality of structural members extending therethrough transverse to said direction of water flow and spaced to evenly distribute the load of said frame member, turbine and generator upon said structural members with said structural members carrying said bearing means and said servomotor means secured to said structural members.

8. A hydraulic turbine installation according to claim 7, wherein said bearing means comprises a plurality of rollers carried by said structural members and bearing rails embedded in said floor presenting a bearing surface abutting said rollers.

9. A hydraulic turbine installation according to claim 8, wherein said frame member is provided with a forewall having said intake means with said forewall extending between said dam sidewalls when said frame member is in said first position and means for providing a generally watertight seal between forewall and said dam sidewalls when said frame member is in said first position.

10. A hydraulic turbine installation according to claim 8, wherein said frame member is provided with a forewall having a width insufficient to extend between said sidewall dams; means for regulating a flow of water between said frame member and dam sidewalls.

11. A hydraulic turbine installation according to claim 8, wherein said forewall abuts a side of said dam when in said first position; means to provide a watertight seal between said side and said forewall; and an adjustable gate for regulating a flow of water between said frame member and the other of said side of said dam.

12. A hydraulic turbine installation according to claim 11, wherein said gate is carried by said frame member and power actuated means carried by said frame for moving said gate between an open position permitting water flow between the frame member and dam and a closed position blocking water flow.

* * * * *